M. DRANE AND H. W. STONE.
PETCOCK OPERATING DEVICE.
APPLICATION FILED NOV. 22, 1920.
1,367,867.
Patented Feb. 8, 1921.
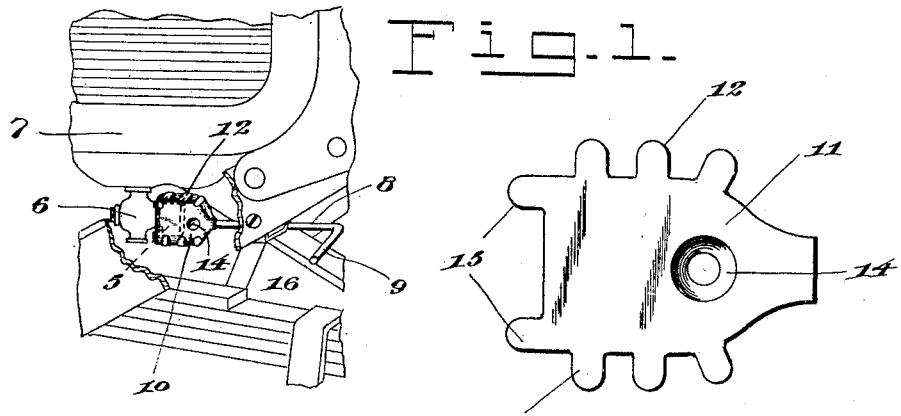
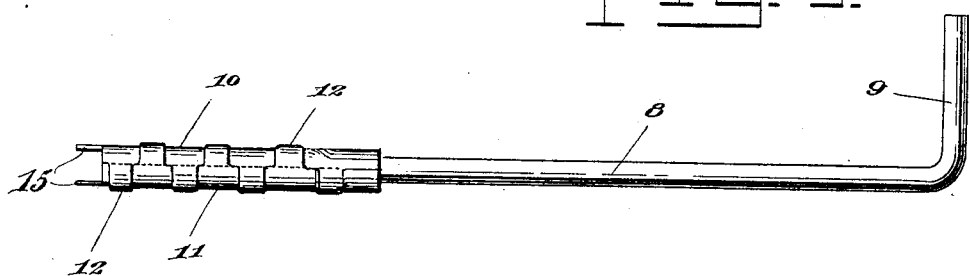
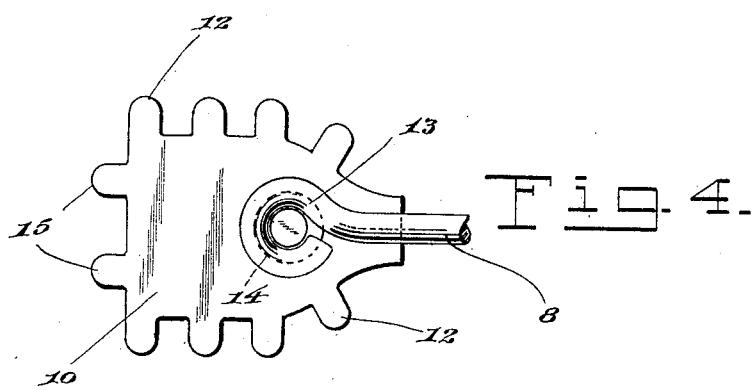
Merritt Drane.
Harry W. Stone.
INVENTORS:
BY May A. Schmidt
ATTORNEY.

UNITED STATES PATENT OFFICE.

MERRITT DRANE AND HARRY W. STONE, OF LOUISVILLE, KENTUCKY.

PETCOCK-OPERATING DEVICE.

1,367,867. Specification of Letters Patent. Patented Feb. 8, 1921.

Application filed November 22, 1920. Serial No. 425,683.

*To all whom it may concern:*

Be it known that we, MERRITT DRANE and HARRY W. STONE, both citizens of the United States, residing at Louisville, in the county of Jefferson and State of Kentucky, have invented certain new and useful Improvements in Petcock-Operating Devices, of which the following is a specification.

This invention relates to devices for operating pet cocks which are not readily accessible, such as the drain cocks of automobile radiators, and the invention has for its object to provide a simple, efficient and easily applied device of this kind.

With the object stated in view, the invention consists in a novel combination and arrangement of parts to be hereinafter described and claimed, and in order that the same may be better understood, reference is had to the accompanying drawing forming a part of this specification.

In the drawing—

Figure 1 is a perspective view showing the application of the device; Fig. 2 is an edge view of the device drawn to an enlarged scale, and Figs. 3 and 4 are plan views of the blanks out of which the device is fashioned.

The preferred embodiment of the invention has been illustrated, but it will be understood that various changes and modifications may be made without a departure from the spirit and scope thereof as claimed hereinafter.

Referring specifically to the drawing, 5 denotes the flat wing-like handle or operating key of a pet cock, the body of which latter is shown at 6. The pet cock is shown applied to the bottom of an automobile radiator 7 to serve as a drain cock, but it is to be understood that the operating device which is the subject matter of the present application for patent is not limited to radiator drain cocks, but may, with equal facility, be applied to other pet cocks situated in more or less inaccessible places.

The operating device for the pet cock comprises a rod 8 having at one end a lateral bend 9 to serve as a handle, and provided at its other end with means for attachment to the wing forming the pet cock handle or key 5.

The attaching means referred to consists of two sheet metal plates 10 and 11, of such shape and dimensions, that when they are assembled to form a sheath or socket, the latter may be slipped over the wing 5.

The sheath is formed by connecting the plates 10 and 11 in laterally spaced relation, they being fastened together at their side edges by tongues 12 projecting from said edges. The tongues are pliable, and the tongues of the plate 10 are bent and clenched over the outside of the plate 11, whereas the tongues of plate 11 are similarly bent and clenched to the plate 10.

The plates 10 and 11 are reduced in width at their rear ends so that the sheath is here formed with a hollow shank to seat the rod 8. The forward end of the rod extends through the shank into the sheath and is here formed with an eye 13. To prevent the rod from slipping out of the sheath, one or both of the plates 10 and 11, are formed with a boss 14 on their inner faces, said bosses seating in the eye 13 of the rod.

The forward end of the sheath is left open so that it may be slipped over the wing 5, and the corresponding edges of the plates 10 and 11 are formed with outstanding pliable tongues 15 which are adapted to be bent over the rear edge of wing 5 on opposite sides of its stem, whereby the sheath is held in place on the wing and is prevented from slipping off the same.

The device is very simple, and it can be easily and cheaply manufactured. The device can also be readily applied, all that is necessary being to slip the sheath or socket over the pet cock handle or key, and then bend the tongues 15 across the rear edge of the latter.

The rod 8 is of suitable length so that its handle 9 may come to any convenient position for operation. Fig 1 shows a supporting bracket 16 for the outer end of the rod, said bracket being secured to the front cross frame member of the car, or any other suitable part.

We claim:

A device for operating a pet cock handle, comprising a rod, a sheath carried by the rod, said sheath having a reduced rear end forming a hollow shank through which the rod extends into the sheath, said rod on the inside of the sheath having an eye, and the sheath being composed of laterally spaced plates connected at their side edges and having interior bosses seating in the aforesaid eye of the rod, and pliable tongues at the open end of the sheath adapted to be bent across the rear edge of the pet cock handle.

In testimony whereof we affix our signatures.

MERRITT DRANE.
HARRY W. STONE.